April 2, 1968   J. P. PALMER   3,376,440
LIQUID METAL PISTON MHD GENERATOR
Filed Sept. 17, 1965

INVENTOR.
BY  JAMES P. PALMER

United States Patent Office 3,376,440
Patented Apr. 2, 1968

3,376,440
LIQUID METAL PISTON MHD GENERATOR
James P. Palmer, Setauket, N.Y., assignor to the United States of America as represented by the United States Atomic Energy Commission
Filed Sept. 17, 1965, Ser. No. 488,295
7 Claims. (Cl. 310—11)

The invention described herein was made in the course of, or under, contract AT(30-2)-GEN-16 with the U.S. Atomic Energy Commission.

The present invention concerns a liquid metal piston magnetohydrodynamics (MHD) generator for the direct conversion of heat to electricity.

In a conventional power plant in which heat is converted into electricity, a working fluid is heated to provide the energy for a prime mover which in turn drives electrical generation apparatus.

During recent years there has been increasing interest in the so-called "direct conversion" heat engines in which the heat is converted directly into electricity. Photoelectric, thermionic, fuel cell, thermoelectric and magnetohydrodynamic (MHD) devices are examples of heat engines operating in direct conversion principles.

In the typical MHD cycle, a working fluid is heated to a state of ionization and made to expand through a magnetic field cutting the lines of force, in effect converting thermal energy into electrical energy. This cycle is of particular interest because it is capable of producing relatively large amounts of electrical energy, there are no moving parts, and much higher temperatures and cycle efficiencies are possible than with some of the other direct conversion and more conventional types of cycles. For example, it has been estimated that in a coal-fired MHD plant, overall cycle efficiency can be increased to 55% from the present 40%. Furthermore, the MHD cycle appears to be suitable for use with nuclear reactor sources of heat which are expected in time to become a major source of electrical power in this country and elsewhere. But if solid nuclear fuel is used, the available temperature is too low for thermal ionization of the working fluid. Hence, attempts are being made to bring about nonthermal ionization of the working fluid, as by radio frequency energy, radiation, and passage through magnetic fields, but heretofore these proposals have not been successful due to high energy inputs required and some very severe stability problems.

There has been developed another approach to the MHD cycle which avoids the ionization problem altogether. If the expanding gas or vapor drives a liquid slug or piston of high conductivity material through a magnetic field, the cycle can be run at low temperatures, and still have high efficiencies. It is closer to the conventional turbogenerator, but differs in that the liquid slug is nondamageable, and requires no bearings. This concept is best fitted to a liquid metal Rankine cycle, because of the high electrical conductivity and efficiency. It is best employed at temperatures above 2000° F., where vapor pressures are high, and can be used either as a topping cycle for power reactors, or as a single cycle for space power generators.

Scientists have worked extensively on such a concept applied to a liquid metal stream accelerated by expansion of metal vapor through a two-phase nozzle. The high velocity liquid is then separated, some of its kinetic energy transformed into electrical energy in an MHD generator, with the balance recovered as a pressure in a diffuser. The main problems are the high liquid velocities (i.e. 500 ft./sec.), low efficiency (i.e. 7%) high nozzle and separator losses, and the low voltage DC output (i.e. 10 v.) of the generator.

The present invention has to do with the use of liquid metal as the working fluid in a magnetic field in such a way as to overcome many of the disadvantages, difficulties and problems which have up to now beset this type of an MHD cycle. By the present invention, an expanding vapor is allowed to reciprocate a liquid metal piston in a generator or a liquid metal slug through a generator, the expansion energy being converted directly into electrical energy, instead of first to kinetic and then to electrical energy, as in the two phase nozzle arrangement. Higher source pressures are then possible, and with consequent increases in cycle efficiencies. Also, since the generator electrodes see a reciprocating slug it can deliver a low-voltage AC (i.e. 10 v.) that can be easily transferred to a high voltage (i.e. 10,000 v.) if desired.

It is thus a first object of this invention to provide an MHD generator in which the working fluid is not thermally ionized.

A further object of the invention is to provide apparatus for utilizing a nuclear source of heat in an MHD generator.

Another object is an MHD cycle utilizing a liquid metal working fluid in a magnetic field.

Still another object is an MHD cycle capable of delivering a low voltage AC output.

Other objects and advantages of this invention will hereinafter become evident from the following description of preferred embodiments of this invention taken with the accompanying drawings in which.

Figure 1:
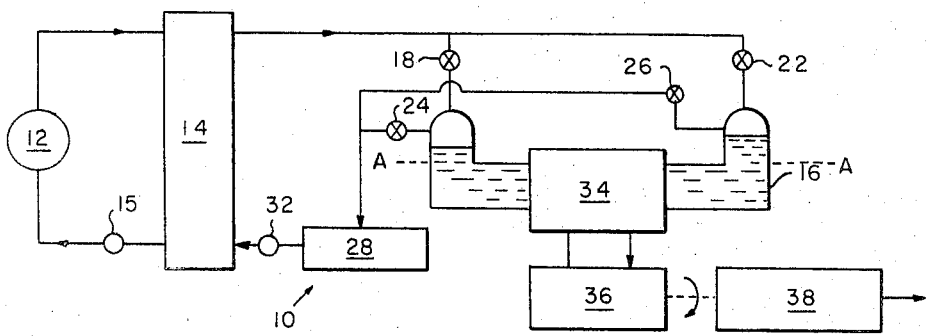
FIG. 1 is an arrangement incorporating the principles of this invention.

Referring to FIG. 1 there is illustrated an arrangement 10 designed for use as a space power plant. Power plant 10 consists of a fast nuclear reactor 12 of suitable design and an external heat exchanger 14. A pump 15 circulates primary fluid between reactor 12 and heat exchanger 14 transferring heat to the latter. The secondary fluid which in the preferred configuration consists of potassium is vaporized in heat exchanger 14 and transferred to generator 16 for expansion by way of a pair of entrance shut-off valves 18 and 22, the mode of operation to be described later. The potassium vapor is exhausted through a pair of exhaust shut-off valves 24 and 26 to radiator 28 in which the potassium is condensed to its liquid form. Pump 32 circulates the liquid potassium back through heat exchanger 14 where it is vaporized once again. Potassium is suitable for this application as it is light in weight, is relatively easily handled and much is known about its characteristics.

Generator 16 is filled partially, as illustrated, by liquid potassium, and the central portion of generator 16 is surrounded by a liquid metal converter 34 which actually is a magnet to establish lines of force through generator 16 and electrodes (not illustrated) integrally mounted in or on the walls of unit 16 for electrically contacting the liquid metal potassium within. Generator 16 would be constructed of material not highly conductive such as stainless steel. The latter would not interpose significant resistance to current flow between the electrodes and the liquid potassium due to the thin steel section and the relatively large surface area. Suitable back up material, separated from electrical contact with the generators, would be used to provide the containing strength of the generator walls against the pressure forces of the potassium vapor.

The voltage output of converter 34 is utilized to drive a motor 36 which in turn is utilized to drive suitable electrical generator apparatus 38 to establish the desired voltage output of the system. Motor 36 may be a homo-polar machine to take advantage of the high currents, low voltage and cycles which would be produced in converter 34. However, if the apparatus is made small enough, it is possible to increase the frequency of the cycle to 25–30 c.p.s. in which event suitable transformer apparatus can be utilized to withdraw the output of the system. Calculations indicate that the liquid metal potassium is capable of producing up to about 68 kilowatts per pound, showing that very small such units are capable of being constructed and used advantageously.

In the operation of the apparatus illustrated in FIG. 1, the liquid potassium is vaporized in heat exchanger 14 under a high pressure established by pump 32. Entrance valve 18 and exhaust valve 26 are opened simultaneously so that the liquid metal within unit 16 is pushed to the right. The liquid metal within unit 16 develops an E.M.F. at right angles to the magnetic field and the direction of motion of the liquid in accordance with Faraday's principle as it cuts the lines of force of the magnetic field established by converter 34. The electrodes mounted in the walls of unit 16 complete an electrical circuit permitting the flow of electrical current which operates motor 36. If the magnetic field is D.C., then of course the magnetic field of motor 36 would be reversed each cycle to have a uni-directional rotation. The potassium vapor exhausting through valve 26 remaining from the previous cycle is at the lowest pressure of the system and is cooled and liquefied in condenser 28 and then pumped in liquid form back to heat exchanger 14 for vaporization once again.

Valves 18 and 26 are then closed and valves 22 and 24 are opened, the sequence of operation thereafter repeating itself with the potassium liquid within unit 16 reversing in direction. Hence it will be seen that the liquid potassium within unit 16 reciprocates and a sinusoidal electrical output is delivered to motor 36. While condenser 28 is described as a radiator to render apparatus 10 suitable for space applications it is readily apparent that any suitable condenser may be used so that the apparatus may be used elsewhere, i.e., as in a terrestrial power plant.

It should be noted in connection with the embodiment just described, that the movement of the liquid metal is limited to that permitted by the two end vertical columns, so that the level in each column does not drop as shown by the dotted lines A below the top of the horizontal portion of generator 16. This presumes a gravitational field or one provided for. That is, for example, generator 16 would be maintained in a position with the end columns vertical as shown to maintain the surfaces against which the vapor is applied. However, the arrangement does have some very advantageous features. The voltage output is very close to a true sinusoidal wave form and there are no gaps in output except when the voltage passes through zero. On the other hand, a major drawback to the free surface piston generator as just described is associated with vapor condensation losses on the piston free surface which can become quite considerable.

Figure 2:
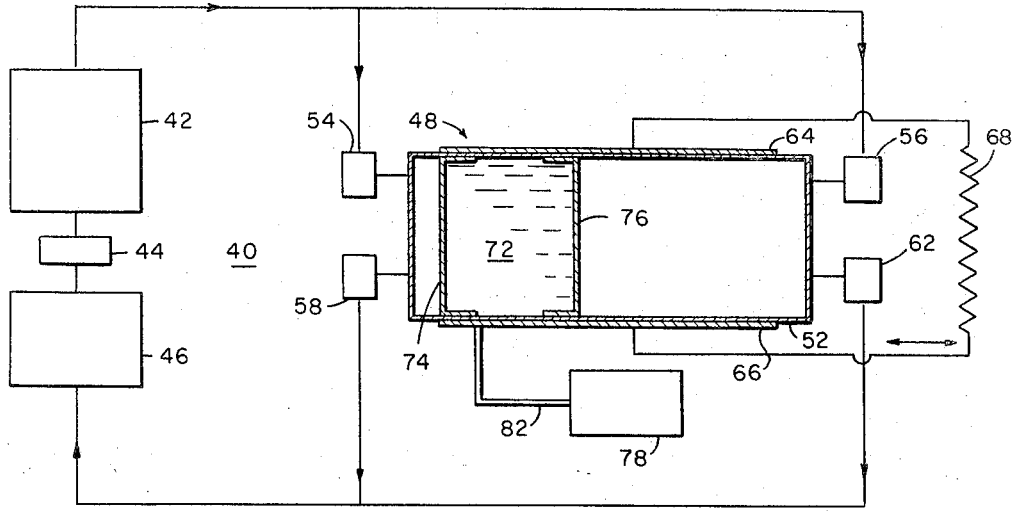
FIG. 2 is an alternate arrangement utilizing a liquid metal piston.

An arrangement embodying the principles of this invention in which low voltages can be produced at very high currents, with simpler structural features, and avoids the losses due to condensation, is illustrated in FIG. 2. There is shown power plant 40 consisting of reactor-boiler 42, feed pump 44 and condenser 46. Reactor-boiler 42 produces the potassium vapor which is delivered to MHD generator 48. Generator 48 consists of a closed cylinder 52 with a pair of working fluid openings at each end, the inlet openings being governed by entrance shut-off valves 54 and 56 and the exhaust openings being governed by exit valves 58 and 62. A magnet (not shown) surrounding cylinder 52 or other means would be utilized to establish a uniform magnetic field through the generator. A pair of oppositely facing electrodes 64 and 66 mounted on and integrally bonded to the walls of cylinder 52 are connected electrically to a load resistance 68 to complete the circuit. Resistance 68 could of course be a suitable motor as in FIG. 1.

Within cylinder 52 is a liquid metal piston 72 capped by a pair of end faces or caps 74 and 76 to maintain the desired piston shape. Caps 74 and 76 would be attached together by rods (not shown) or other suitable means. Since the liquid metal would be the same material as the vapor, e.g., potassium, some leakage would not interfere with operation of the apparatus. A source 78 connected by way of conduit 82 to cylinder 52 may be utilized to replace liquid metal leaking out of piston 72. Source 78 may be utilized also to maintain the liquid within piston 72 at a higher pressure than the vapor to limit vaporization within piston 72 and also to circulate metal through piston 72 to limit the temperatures reached therein.

In the arrangement just described, piston 72 would reciprocate in a manner similar to that in FIG. 1. The EMF developed across piston 72 would reverse at each stroke so that an A.C. output is produced.

The magnetic fields in the described arrangements would be maintianed at uniform value, preferably of the order of 4% spread or less, to obtain maximum efficiencies.

It is thus seen that there has been provided a unique application of MHD to liquid metals and nuclear reactor sources. This invention makes it possible to apply the principles of MHD without relying on thermal ionization which heretofore has imposed temperature limitations on such apparatus.

While several preferred embodiments of this invention have been described it is understood that the invention is not to be limited thereto but is to be defined only by the scope of the appended claims.

I claim:
1. Magnetohydrodynamic electrical generation apparatus comprising:
   (a) means containing for reciprocal movement a slug of liquid metal, said slug being held in a piston like shape by a pair of end caps;
   (b) means for establishing a magnetic field across the path of movement of said slug;
   (c) closed electric circuit means extending across the path traversed by said slug, including means to contact electrically said slug moving along said path at an angle to the direction of slug movement thereby forming a complete electrical path for current flow through said slug when said slug is in electrical contact with said contact means; and
   (d) means for driving said slug along said path through said magnetic field to cause an EMF across said slug, thereby causing electric current to flow through said electric circuit means while said slug is in contact electrically with said contact means.

2. The apparatus of claim 1 in which a vapor under pressure drives said slug.

3. The apparatus of claim 2 in which the vapor is made from said liquid metal.

4. Magnetohydrodynamic electrical generation apparatus comprising:
   (a) heat means to vaporize liquid metal at relatively high pressure;
   (b) means for expanding said vapor and producing electrical energy; and
   (c) means for condensing said vapor and returning the condensed vapor under pressure to said heat means for vaporization;
   (d) said expanding means including a slug of said liquid metal driven reciprocally by said vapor during expansion, said slug consisting of a pair of end caps separated by said liquid metal, means establishing a magnetic field whose lines of force extend through the path taken by said slug at an angle to the direction of motion of said slug, and means for carrying away electric current produced by an EMF across said slug developed by the cutting of said lines of force by said slug.

5. The apparatus of claim 4 having means to effect the reciprocation of said slug including valve means to cause vapor inlet and exhaust to maintain the reversible movement of said slug.

6. The apparatus of claim 5 having means to replace liquid metal leaking from said slug.

7. The apparatus of claim 5 having means to pressurize and circulate liquid metal in said slug to prevent vaporization of liquid metal in said slug.

References Cited
UNITED STATES PATENTS

| 2,362,283 | 11/1944 | McCollum | 310—11 |
| 3,286,108 | 11/1966 | Fonda-Bonardi | 310—11 |

DAVID X. SLINEY, *Primary Examiner.*